Figure 6:
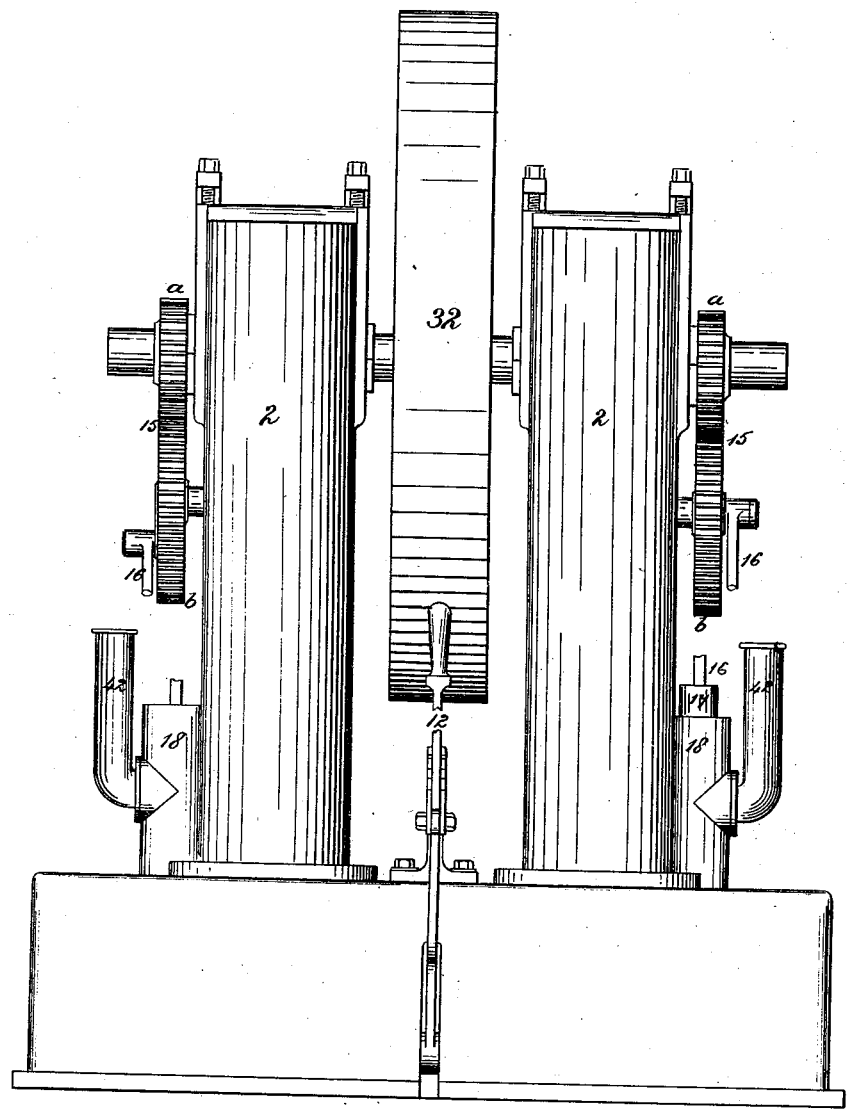

(No Model.)
R. HUTCHINSON.
GAS ENGINE.
No. 253,709.
6 Sheets—Sheet 1.
Patented Feb. 14, 1882.
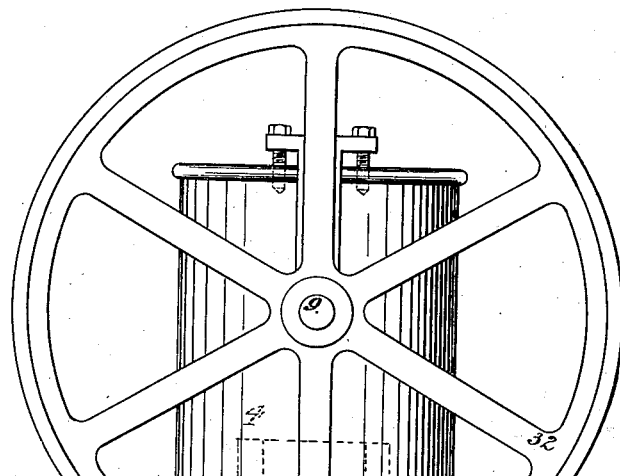
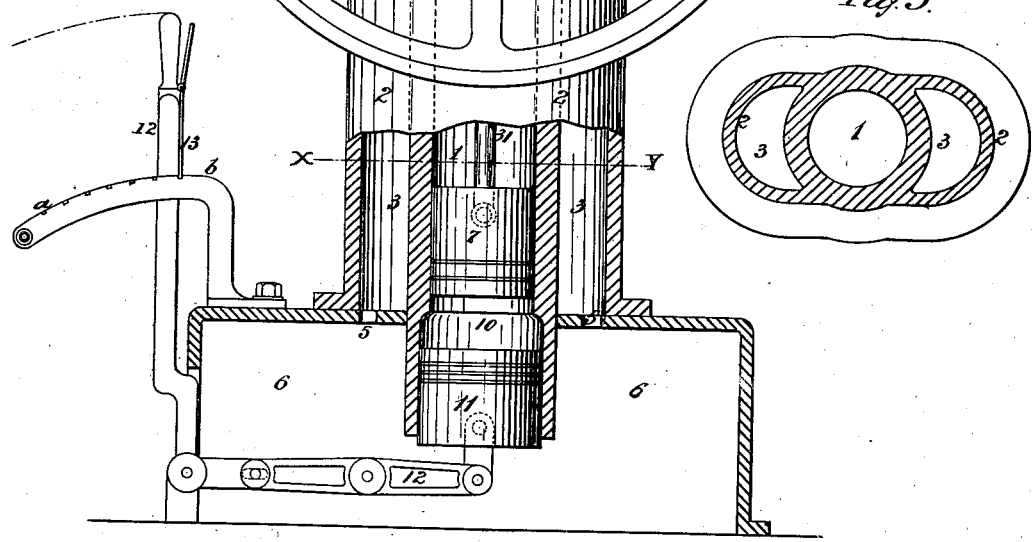
Witnesses.
J. A. Rutherford
Robert Everett
Inventor.
Richard Hutchinson.
By James L. Norris,
Atty.

(No Model.)
R. HUTCHINSON.
GAS ENGINE.
No. 253,709.
6 Sheets—Sheet 2.
Patented Feb. 14, 1882.
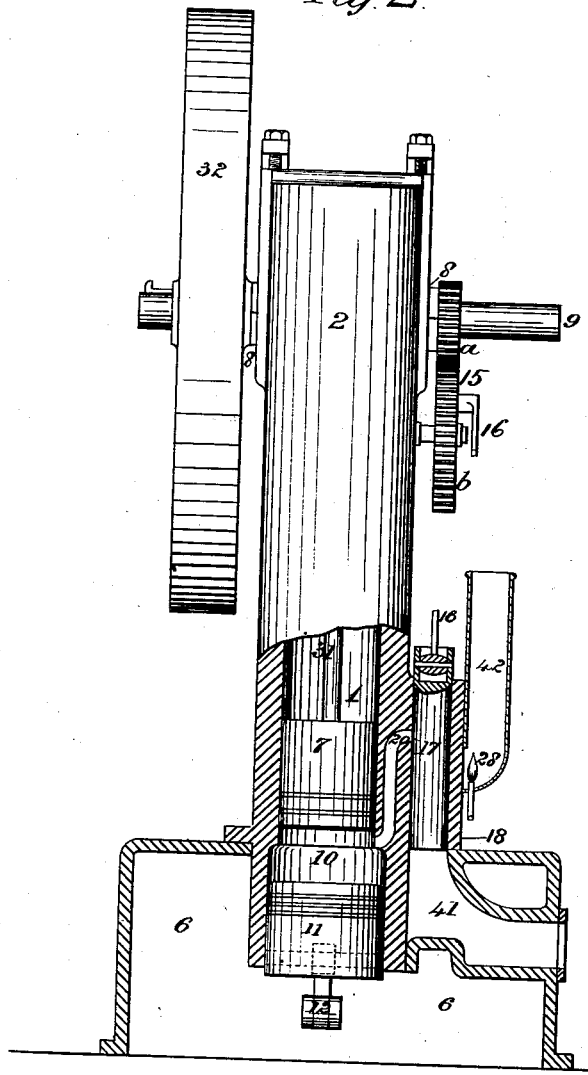
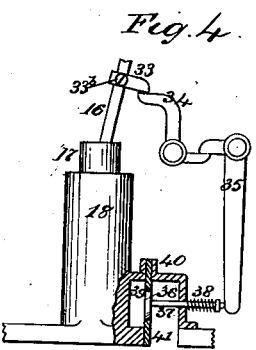
Witnesses,
J. A. Rutherford
Robert Everett
Inventor,
Richard Hutchinson.
By James L. Norris.
Atty.

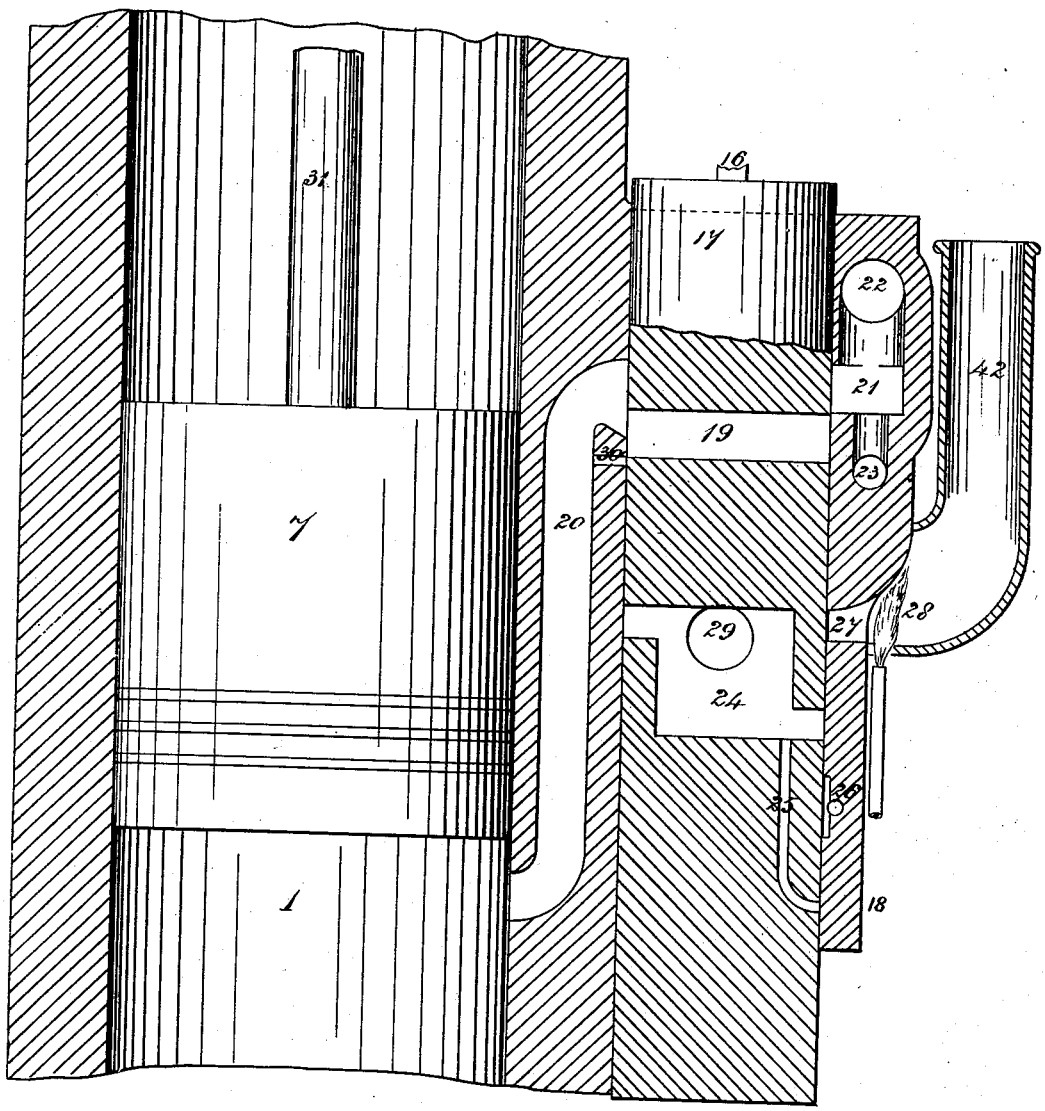

(No Model.)

R. HUTCHINSON.
GAS ENGINE.

No. 253,709.

6 Sheets—Sheet 4.

Patented Feb. 14, 1882.

Witnesses.
J. A. Rutherford
Robert Everett

Inventor
Richard Hutchinson.
By James L. Norris,
Atty.

(No Model.)
R. HUTCHINSON.
GAS ENGINE.
No. 253,709.
6 Sheets—Sheet 5.
Patented Feb. 14, 1882.
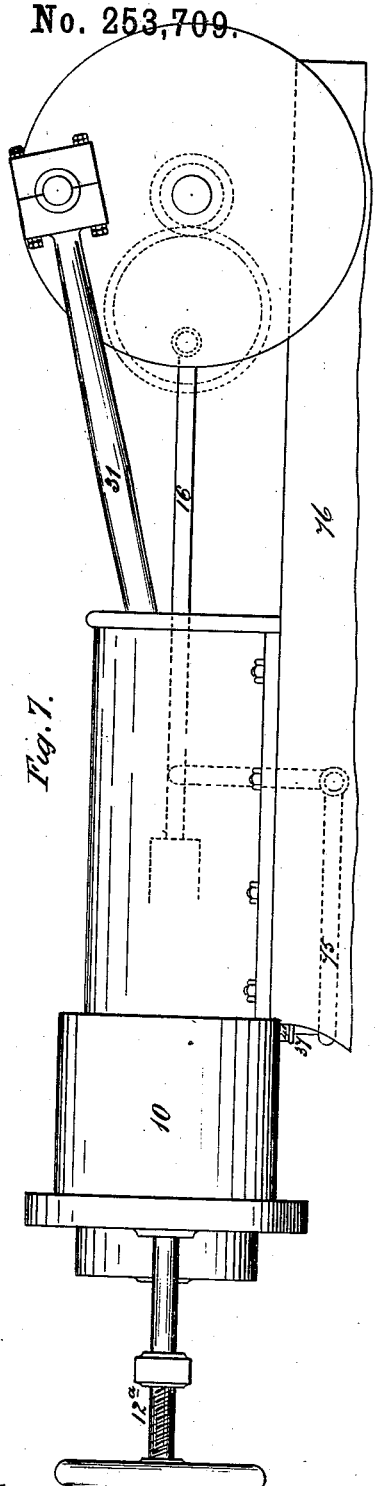
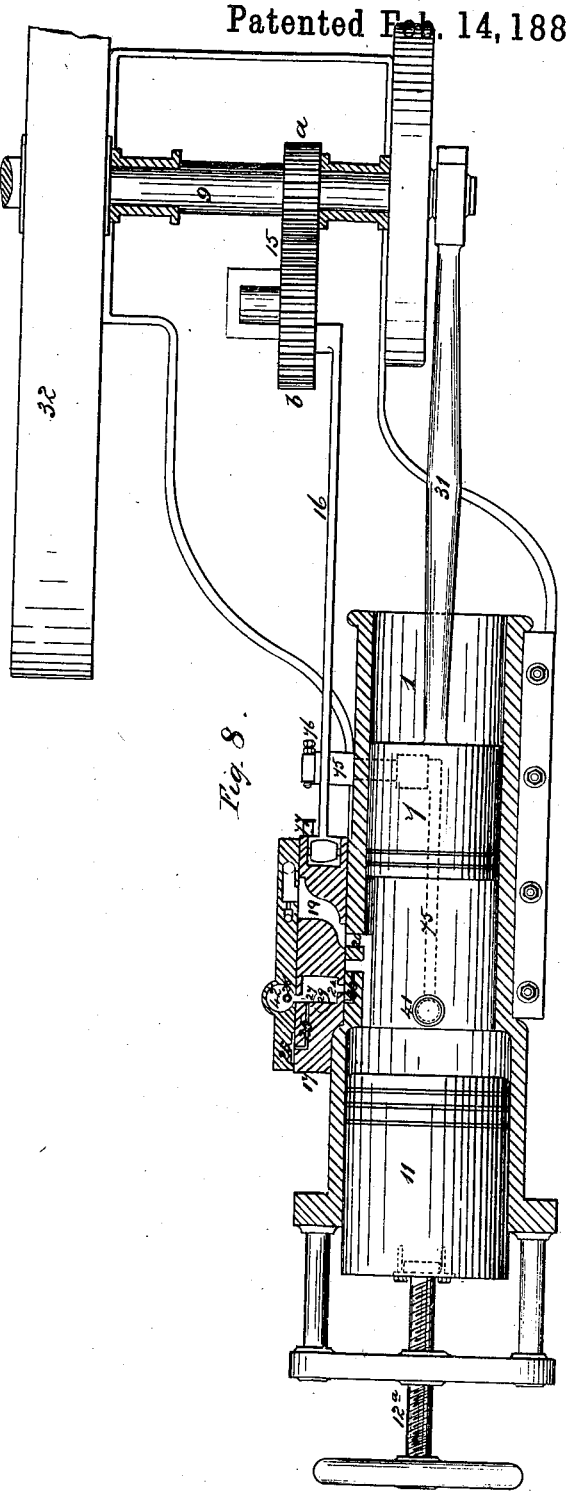
Witnesses.
J. A. Rutherford
Robert Everett
Inventor:
Richard Hutchinson.
By James L. Norris.
Atty (No Model.)
R. HUTCHINSON.
GAS ENGINE.
No. 253,709.
6 Sheets—Sheet 6.
Patented Feb. 14, 1882.
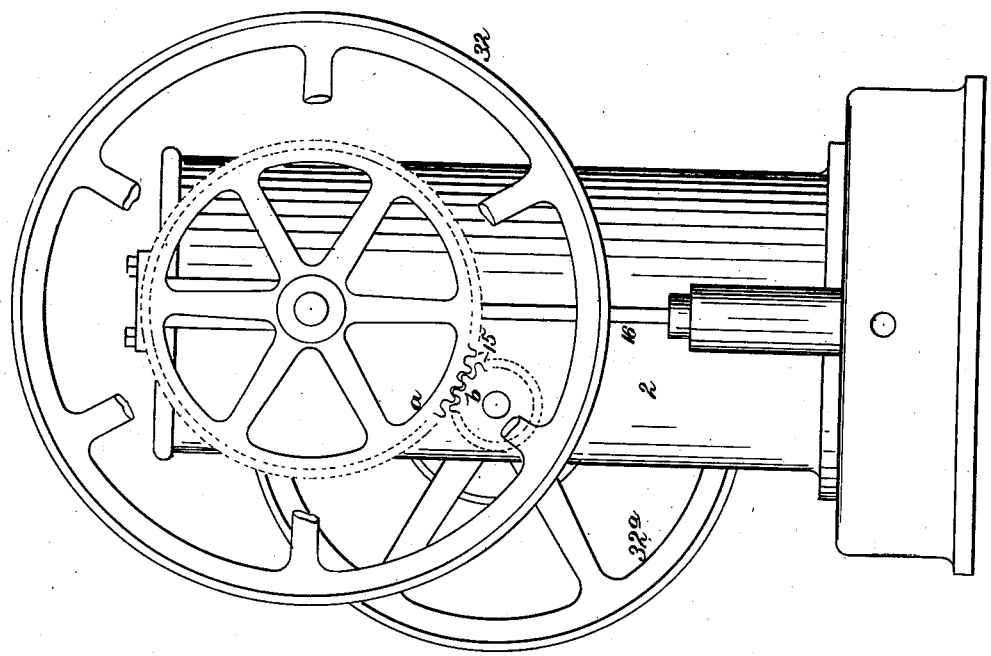
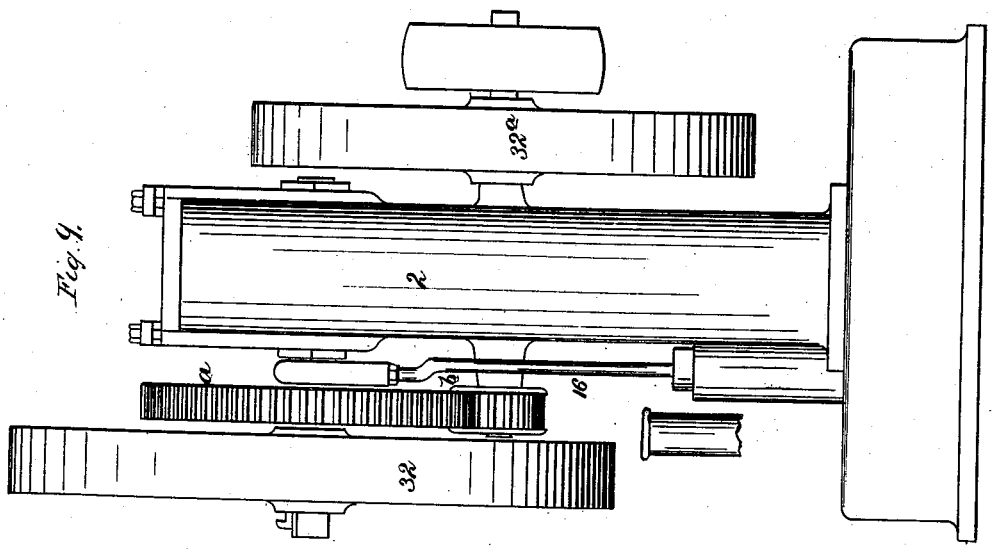
Witnesses
J. A. Rutherford
Robert Ewart
Inventor.
Richard Hutchinson.
By James L. Norris.
Atty.

UNITED STATES PATENT OFFICE.

RICHARD HUTCHINSON, OF LONDON, ENGLAND.

GAS-ENGINE.

SPECIFICATION forming part of Letters Patent No. 253,709, dated February 14, 1882.

Application filed September 12, 1881. (No model.) Patented in England December 29, 1880.

*To all whom it may concern:*

Be it known that I, RICHARD HUTCHINSON, a subject of the Queen of Great Britain, residing at Mildmay Park, London, England, have invented a new and useful Improvement in Gas-Engines, (for which I have obtained a patent in Great Britain, No. 5,471, bearing date December 29, 1880,) of which the following is a specification.

This invention has for its object improvements in the construction of that class of motors in which a mixture of combustible gas or vapor and air is exploded as a source of power by being ignited within a cylinder or cylinders, so as to operate by the explosive force thereof.

An important object I have in view in the construction of the gas-motor engines of my invention is the working of these engines with the gaseous mixture in a state of considerable compression, whereby the power developed is considerably increased as compared with that obtained in the cylinders of gas-motor engines worked with the gaseous mixture only slightly compressed. The parts of my improved gas-motor engines are so arranged as to allow of the degree of compression being easily controlled or varied, and, what is of considerable importance, to allow of them being started conveniently.

The chief features and general arrangement of the gas-motor engines of my invention are substantially as follows:

The power is developed in one or two single-acting cylinders having combined therewith another cylinder of a reduced diameter; and in order to reduce the cost of manufacture, and to simplify as much as possible the construction, as well as to prevent vibration, and to make the fixed parts of my gas-motor engine rigid, I employ a cylinder or cylinders of novel construction placed vertically, and having semicircular passages running vertically down the sides of the said cylinder or cylinders to or into the base thereof. These vertical passages serve also to allow of the circulation of currents of air caused by the outward and inward motion of the piston acting as a double-acting pump for the purpose of keeping the cylinder or cylinders cool, and which are mounted upon a base at or near the top, or sometimes at the base of the cylinder or cylinders, and at a convenient point I cast or form bearings in which the main or crank shaft works. With a view to allow of the gaseous mixture being compressed to a high degree, I employ another cylinder, combined with the first-named cylinder, and by preference of increased diameter relatively thereto, and in which I accurately fit a plunger capable of being moved up or down by an independent lever, screw, or other suitable mechanical equivalent therefor.

When the engine described in the last paragraph is at rest and the plunger at its lowest extremity the engine can be readily started with the gaseous mixture at a low pressure; and it is obvious that if the plunger be raised in the before-mentioned second cylinder or cylinders, I compress the gaseous mixture within the working-cylinder to a higher degree, and thereby reduce the quantity of gas used, and consequently I lessen the cost of working. If the last-mentioned operation is repeated and the plunger raised farther, I again obtain an extra degree of compression, and so on until the plunger has reached its full extremity toward the working cylinder or cylinders. The engine will then be at full power, operating with the combustible mixture of gas and air in a state of considerable compression, and is therefore more economical than many gas-motor engines introduced hitherto.

To ignite the compressed combustible gaseous mixture in the working cylinder or cylinders hereinbefore described, I construct a piston or plunger working in a small cylinder attached to the working-cylinder. In this piston or plunger I make a chamber or passages or ports so arranged as to allow of the introduction of an internal gas-jet which is relighted after each explosion, when necessary, by an external gas-flame. The explosive mixture of gas and air is admitted to the cylinder through the piston or plunger described in the last paragraph. Sometimes, for the sake of convenience, I use a separate small cylinder and piston or plunger valve fitted to the opposite side of the before-mentioned cylinder or cylinders to the igniting one, and which is furnished with suitable ports and passages for the admission of the gas and air, and for the discharge of the products of their combustion.

For the purpose of regulating the speed of motor-engines of my invention I propose employing a suitable governor in connection with the gas-regulator valve.

For the better explanation of my invention I refer to the accompanying sheets of drawings. The several parts are marked with reference-numbers, corresponding parts, wherever they occur, always bearing the same reference-number.

The construction of my improved cylinder is shown in Figures 1, 2, and 3. Fig. 1 is a side elevation, partly in section, of my compressing-engine; Fig. 2, a front elevation of the same; and Fig. 3, a plan, partly sectional, taken at the line $xy$ on Fig. 1. Fig. 4 is a view, partly in section and partly in elevation, of an exhaust apparatus for carrying off the products of combustion; Fig. 4$^a$, a detail view, showing the tappet 33. Fig. 5 represents, on an enlarged scale, a sectional view of the piston and a portion of the cylinder, and also the apparatus for the admission of air and gas and means for admitting of the ignition of the gas. Fig. 6 represents my improvement employed in a complete engine in which one fly-wheel is employed for two pistons working in separate cylinders. Fig. 7 is a side view, and Fig. 8 a part plan and part longitudinal section, of my invention applied to a horizontal engine. Figs. 9 and 10 are side views of the engine with a modified arrangement of driving mechanism.

The working-cylinder 1 has two semicircular castings, 2 2, combined with it and cast in one piece therewith, as shown in Figs. 1 and 3. The two semicircular passages 3 3, as well as the space 4 over the cylinders, communicate with the open air through openings 5 5, formed in the top of the engine-base 6 and in the sides or the bottom edge thereof, the openings in the sides of said base not being shown. The up-and-down motion of the working-piston 7, acting as a double-acting pump, causes, in conjunction with the heat of combustion, a strong current of air through the passages 3 3, thereby effectually preventing the cylinder 1 and the piston 7 from becoming overheated. In addition to the cooling influence, as just explained, the two semicircular castings 2 2 impart considerable firmness and rigidity to the engine and prevent vibration. I do not confine myself exclusively to making these parts 2 2 on one piece with the cylinder 1 or of cast-iron, although I prefer to do so. I may make them separate from the cylinder and bolt them together. The two parts 2 2 are united above the level of the cylinder, and therein I form slots for the reception of the crank-shaft bearings 8. If more convenient, I fix the bearings for the crank-shaft 9 at or near the bottom of the cylinder 1.

The compressing-cylinder 10, I prefer to make of a larger diameter than the working-cylinder 1. It may be cast in one piece with either the working-cylinder 1 and its two supports 2 2 or with the base 6. The plunger 11 is raised or lowered in the compressing-cylinder by means of the hand-lever and its connections 12. When the hand-lever 12 is pulled back until its catch 13 falls into notch $a$ in the quadrant the plunger 11 will be moved downward (or outward) to the full extent of its travel, thereby practically increasing the capacity of the working-cylinder 1. A given charge of gas and air admitted into the working-cylinder when the plunger 11 is in the position just described would be at low pressure, and consequently the starting of the engine would be much less difficult than if it had to be effected with a high-pressure charge in the cylinder. By moving upward, (or inward,) thereby contracting the practicable capacity of the working-cylinder 1 more or less, according to the distance the hand-lever is moved in the direction indicated, so that no matter at what pressure it is desired or required to run the engine such pressure can always be easily obtained after the engine has been started without increasing the volume or strength of the charge of gas and air admitted into the working-cylinder at each inspiration. I thus get over the difficulty which is so often met with in attempting to light a mixture of gas and air under high pressure, as well as at the same time securing the maximum economy in the consumption of gas. Supposing that the engine has been started at low pressure, and then by moving the hand-lever, as above described, made to run at a higher pressure, with a correspondingly increased development of power and greater economy, it is clear that by further raising (or forcing inward) the compressing-plunger 11 a still greater degree of compression, with its attendant advantages, will be obtained, until, by raising the plunger to the end of its travel, the engine is made to run at maximum pressure, power, and economy. It is not required that the engine should be stopped while the pressure in the cylinder is being increased in the way described above. The pressure can always be increased (or diminished) while the engine is running if, from any variation in the load, a corresponding increase or decrease of the development of the power of the engine is required.

The advantages stated in the preceding paragraph as derivable from my system of variable compression by means of my compressing cylinder and plunger are quite separate and distinct from any variation in the power of an engine which it is possible to secure by varying the supply of gas and air to the working-cylinder. Whatever may be the quantity of gas and air drawn into the working-cylinder at any inspiration of the working-piston of my compressing-engine, the amount of power derivable from the combustion thereof is always capable of variation by enlarging or contracting the capacity of the working-cylinder in the way and by the means already described.

I do not confine myself to the use of the lever arrangement 12 (shown in Figs. 1 and 2) for actuating the compressing-plunger 11. I may make use of any well-known mechanical arrangement, screw or otherwise, for performing this part of the work of my engine; but whatever mechanism I employ I always work it by hand, and not by gearing it in any way with the engine in such a way as to be worked by the action of the latter.

When required I may make the engine shown in Figs. 1 and 2 as a coupled engine, according to the design exemplified in Fig. 6.

Fig. 2 represents the engine-piston 7 at the bottom of its stroke. A space is always left between the bottom of the piston and the bottom of the cylinder. As shown at Fig. 2, it is now on the point of rising to draw in a charge of gas and air. The duty performed in the previous (i. e., down) stroke was to expel the products of the last combustion from the cylinder 1.

The piston or plunger valve 17, with the necessary ports, chambers, and passages for admitting the mixture of gas and air into the engine cylinder or cylinders of my compressing-engine, whether single or coupled for igniting said charge, as well as for providing for the expulsion of the products of combustion, is shown in part in Fig. 2. It is shown in full detail in Fig. 5, which, for the sake of greater clearness, is drawn double size. This Fig. 5 represents the valve 17 in a position corresponding with that of the piston 7. (See Fig. 2.) The way in which I actuate this valve in its cylinder 18 is seen in Fig. 2. The crank-shaft 9 carries one wheel of a two-to-one gear, 15. The valve is connected with the larger wheel of this two-to-one gear by a crank and connecting-rod, 16. The effect of the two-to-one gear is, that the valve 17 makes one stroke to two made by the piston 7. So soon as the piston 7, actuated by the momentum of the fly-wheel 32, with which it is connected by the connecting-rod 31 and the crank-shaft 9, commences its up (or inspiration) stroke, the valve 17 rises in accord therewith. The upstroke of the piston 7 leaves a vacuum in the cylinder 1, and as soon as the port 19 opens up a through communication between the port 20, formed in the side of the cylinder 1, and the chamber 21, formed in the side of the cylinder 18, the pipes 22 and 23, (of suitable relative sectional areas,) illustrated in Fig. 5, and carrying air and gas, respectively, discharge into the port 19 and by the port 20 into the cylinder 1. By the time the piston 7 has reached the top of its upstroke (during which it has drawn a charge of gas and air mixture into the cylinder 1 and the port 20) the valve 17 has risen till the port 19 has cleared the port 20 and the chamber 21 and brought the chamber 24 and port 25 into communication with the chamber 26. A small pipe discharging into chamber 26 supplies it with gas, which, so long as there is a communication between 24 and 26, is free to flow along the port 25 into the former. The chamber 24 is next brought into communication with the chamber 27, close to which and communicating therewith is a constant gas-flame, 28. Air is fed into the chamber 24 by the air-port 29, for the purpose of maintaining the combustion of the gas therein after it has been fired by the flame 28. At the moment the chamber 24 is in full communication with the chamber 27 the piston 7 begins its downstroke, during which it compresses the charge of gas and air. While the piston is making this down or compressing stroke the valve 17 continues to rise, bringing the port 25 through the chamber 24 into communication with the inside of the cylinder 1 by means of the ports 30 and 20. Consequently the burning gas and air in the chamber 24, whose duty is to ignite the gas and air mixture in the cylinder, are subjected to the same degree of pressure as that of the mass of gaseous matter they are intended to ignite. This adjustment of pressure is accomplished instantaneously. Immediately after the piston 7 has reached the bottom of its downstroke—i. e., at the moment it is in the act of commencing its upstroke—the chamber 24 is brought opposite the port 20, and the charge of gas and air mixture in the cylinder 1 and the port 20 is immediately ignited. If the relative pressures within the cylinder 1, the port 20, and the chamber 24 had not been already adjusted, the flame in the latter would most probably be extinguished as soon as it is brought opposite the port 20. The expansion of the gaseous contents of the cylinder consequent upon ignition drives the piston upward. This impulse is communicated to the crank-shaft 9 by the connecting-rod 31, and so to the fly-wheel 32, the momentum of the latter compelling the piston to continue its reciprocating motions until it receives another impulse from another ignition. While the piston is communicating motion to the crank-shaft the valve 17 descends through one-half its stroke. The next stroke of the engine-piston (a downstroke) is the exhausting-stroke for the sake of clearing the cylinder of the products of the combustion of the gas and air mixture.

The exhaust-valve is opened as follows: On the valve-connecting rod 16, I mount at a convenient point a tappet, (by preference made adjustable,) 33. (See Fig. 4.) This tappet, at the moment the piston begins its exhausting-stroke, actuates the bell-crank levers 34 and 35, thus driving the valve-rod 37 and exhaust-valve 36 inward. The cavity 39 of the valve-box 40 is always in communication with the cylinder 1, so that as soon as the valve 36 is opened, as just described, the exhaust-gases are expelled by the downstroke of the piston 7 via the exhaust-passage 41. At the proper time the two bell-cranks disengage, the spring 38 on the valve-spindle closes the valve, and the engine repeats the before-described motions in the same order as before.

The bell-cranks 34 and 35 are mounted in their correct positions in any convenient way. I may use an arrangement of cams instead of the bell-crank levers 34 and 35.

The air-pump pipe 22 leads direct from the chamber 20 into the outer air. The gas-pipe 23 leads direct to the gas-supply. Each of these pipes will be furnished with an ordinary back-pressure valve opening inward to prevent the compressed gas and air mixture or any of the exhaust-gases passing out through them. The exhaust-gases present in the port 19 are not of sufficient importance to necessitate any special arrangement for their escape. The pipe delivering gas into chamber 26 is brought from any convenient point through the side of the cylinder 18. The constant flame 28 is fed from any convenient point, and its extinction by accident is prevented by the chimney-shaped guard 42.

I may, if desirable, introduce a charge or current of pure air into or through the port 19 at any time after the explosion. The air can thus be introduced from pipe 22 when the piston is in position to bring port 19 opposite chamber 21, the gas-supply through pipe 23 being of course cut off by a cock, which, although not shown, will be provided on said pipe in any convenient locality. The air-port 27 passes through the side of the cylinder 18, as shown in Fig. 5.

Sometimes, in lieu of the admission, igniting, and exhausting valves, with their several connections and ports, as shown in Figs. 2 and 4, I use any convenient and ordinary lighting-valve fixed to the same side of the engine as is the valve 17, and actuate it in any convenient way, and on the opposite side of the engine and actuated by an eccentric on the crank-shaft or otherwise I fix a suitable valve with ports for the admission of the gas and air mixture and the due exhaust of the waste gases.

The valve 17 is not always connected to the large wheel of the two-to-one gear 15, as shown in Fig. 2. I sometimes place an ordinary eccentric or cam on the axis of the large wheel *b*, between it and the engine, and actuate the valve from said eccentric or cam.

I propose arranging the tappet 33 upon the rod 16 so that it can be adjusted both horizontally and vertically. By adjusting it horizontally it will have a longer or shorter reach over the top arm of the bell-crank lever 34, and hence provide for keeping the exhaust-valve open for a longer or shorter time; and by adjusting the tappet vertically upon rod 16, I provide for opening the exhaust-valve sooner or later, as may be desired. In lieu of the tappet, a cam or its equivalent can be employed. For the purpose of adjusting the tappet 33 horizontally it is formed with a slot, 33ª, through which rod 16 passes. A set-screw, 33ᵇ, will pass through the tappet and abut against said rod, so as to hold the tappet on its adjustment.

In the construction shown in Figs. 7 and 8 the temporarily fixable and movable compressing-piston 11 is actuated by a screw, 12ª, (or other suitable mechanical device,) working in a cross-bar firmly attached in any convenient way to the compressing-cylinder 10. Like the piston 11 in Figs. 1 and 2, it can be fixed at any point desired. The piston-valve 17 is the same as shown in Fig. 5, except that the port 19 is serpentine instead of being straight. The chimney 42 is of course vertical. The valve is connected with the crank-shaft in the same way as described under Fig. 2. The exhaust-valve (not shown in the drawings) is of the same pattern as the one shown in Fig. 4, and it, like that, carries a closing-spring upon its spindle 37. The double-cranked bell-lever 75 is in part under the cylinder, within the engine-bed 76. It is actuated by the stud 77 on the end of the piston-valve. The spindle 37 of the exhaust-valve passes through a stuffing-box within the exhaust-exit 41, from the side of which the exhaust-gases are led away by a pipe. The bell-crank lever 75 is always made adjustable by means of a stout screw, 76, against the end of which the stud 77 strikes. I do not confine myself to the screw 76, as shown. I may use any convenient method for effecting my object, which is to make it possible to open the exhaust-valve at any desired point of the engine-stroke.

The valve shown in Fig. 2 and in detail in Fig. 5 and again in Fig. 8 as the one I use by preference with my high-pressure or compressing engine is made sometimes of a circular section and sometimes of a rectangular section.

Figs. 9 and 10 show an arrangement of gearing when the engine is to be used as a high-speed engine for driving dynamo electric machines and the like, and will be readily understood from said illustrations, it being evident that the band-wheel 32ª will, by reason of the gearing 15 on wheels *a* and *b*, be driven at a high rate of speed.

Having fully described my invention, what I desire to claim and secure by Letters Patent is—

1. The combination, in a gas-motor engine, of the piston-cylinder with the semicircular jackets arranged so that an agitation or a circulation of air will be maintained at each stroke of the working-piston, and thereby keep the cylinder cool, substantially as described.

2. The combination, in a gas-motor engine, of the piston-cylinder and piston with the plunger 11, arranged within the compressing-cylinder at one end of the piston-cylinder, and devices for operating and adjusting said plunger for the purpose of increasing or decreasing the area of the explosion portion of the cylinder, substantially as described.

3. The combination, in a gas-motor engine, of the piston with the working-cylinder provided with a port or passage, 20, the plunger-valve 17, located within the cylinder 18, and provided, substantially as described, with ports and chambers for admitting at the proper moment the mixture of gas and air into the said working-cylinder, the crank-shaft 9, the gear-wheels 15, and connections between one of these gear-wheels and the plunger-valve, substantially as shown and specified.

4. The combination, in a gas-motor engine, of the working-cylinder 1, provided with a port or passage, 20, the cylinder 18, provided with a chamber, 21, communicating with pipes for the admission of air and gas, the plunger-valve 17, provided with a port, 19, for discharging the air and gas into the port of the working-cylinder, the chamber 24, and the port 25, communicating therewith, the chamber 26, for receiving gas from a small supply-pipe and for discharging the same into the port 25 when said port and chamber are brought into communication, the air-port for feeding air into the chamber 24, the chamber 27, and connections between the piston and the plunger-valve, said members being constructed and organized for operation substantially as described.

5. The combination, in a gas-motor engine, of the working-cylinder, the cylinder 18, and the plunger-valve 17, having the necessary ports, chambers, and passages for admitting air and gas to the working-cylinder, with the exhaust-valve 36, adapted to be opened to admit of the expulsion of the exhaust-gases by the downstroke of the piston, the tappet upon the rod of the plunger-valve, and the bell-crank levers 34 and 35, adapted to operate, substantially as described, to actuate the exhaust-valve rod, for the purpose specified.

In witness whereof I have hereunto signed my name in the presence of two subscribing witnesses.

RICHARD HUTCHINSON.

Witnesses:
HENRY GARDNER,
RICHARD CORE GARDNER.